US012587391B2

(12) United States Patent
Ma et al.

(10) Patent No.: US 12,587,391 B2
(45) Date of Patent: Mar. 24, 2026

(54) DATA TRANSMISSION METHOD, APPARATUS, SYSTEM, ELECTRONIC DEVICE AND READABLE MEDIUM

(71) Applicant: BOE TECHNOLOGY GROUP CO., LTD., Beijing (CN)

(72) Inventors: Xitong Ma, Beijing (CN); Tao Li, Beijing (CN); Kai Zhao, Beijing (CN); Youxiang Xia, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 344 days.

(21) Appl. No.: 18/019,843

(22) PCT Filed: Jan. 27, 2022

(86) PCT No.: PCT/CN2022/074293
§ 371 (c)(1),
(2) Date: Feb. 6, 2023

(87) PCT Pub. No.: WO2023/141876
PCT Pub. Date: Aug. 3, 2023

(65) Prior Publication Data
US 2024/0259218 A1 Aug. 1, 2024

(51) Int. Cl.
*H04L 9/32* (2006.01)
*H04L 9/06* (2006.01)
*H04L 9/40* (2022.01)

(52) U.S. Cl.
CPC .......... *H04L 9/3268* (2013.01); *H04L 9/0618* (2013.01); *H04L 63/0428* (2013.01)

(58) Field of Classification Search
CPC ....... H04L 9/3268; H04L 9/0618; H04L 9/32; H04L 9/04; H04L 63/0428; H04L 63/0823
See application file for complete search history.

(56) References Cited

U.S. PATENT DOCUMENTS 11,120,145 B2 9/2021 Gurin
2013/0305039 A1* 11/2013 Gauda ................. G06F 21/6272
713/153

(Continued)

FOREIGN PATENT DOCUMENTS

CN 102202057 A 9/2011
CN 107370597 A 11/2017
(Continued)

*Primary Examiner* — Khoi V Le
(74) *Attorney, Agent, or Firm* — HOUTTEMAN LAW LLC

(57) ABSTRACT

A data transmission method, an apparatus, a system, an electronic device and a readable medium are disclosed, and belong to the technical field of computers. The data transmission method of the present disclosure includes: receiving original transmission data transmitted by a data transmission device; determining a security key corresponding to the original transmission data, and performing an encryption and decryption processing on the original transmission data through the security key, to obtain security transmission data; and transmitting the security transmission data to the data transmission device; wherein the original transmission data is transmitted between the data transmission device and a cloud platform, and the security key is obtained from the cloud platform. The present disclosure can improve the security of data transmission and avoid the problem of cracking in the data transmission process.

13 Claims, 6 Drawing Sheets

(56) References Cited

U.S. PATENT DOCUMENTS

| | | | | |
|---|---|---|---|---|
| 2017/0149937 A1* | 5/2017 | Ren | .......................... | H04W 4/70 |
| 2019/0069167 A1* | 2/2019 | Rowell | ................... | H04L 63/18 |
| 2021/0044972 A1* | 2/2021 | Murray | ................ | G06F 21/602 |
| 2021/0152545 A1* | 5/2021 | Park | ...................... | H04L 9/3268 |
| 2021/0209237 A1* | 7/2021 | Gurin | ........................ | H04L 9/14 |
| 2023/0052663 A1* | 2/2023 | Sheppard | ............. | H04L 9/0861 |

FOREIGN PATENT DOCUMENTS

| | | | |
|---|---|---|---|
| CN | 107566397 A | 1/2018 |
| CN | 111786799 A | 10/2020 |
| CN | 112789618 A | 5/2021 |
| CN | 112804310 A | 5/2021 |
| CN | 109194905 B | 9/2021 |

* cited by examiner

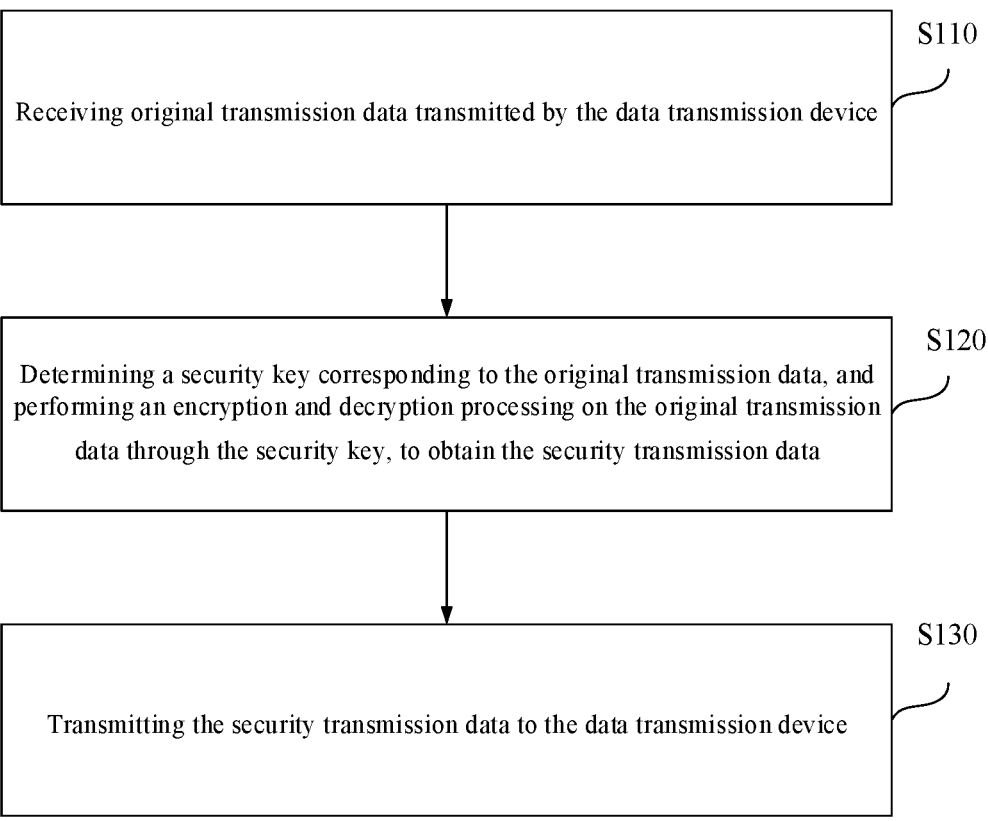

S110

Receiving original transmission data transmitted by the data transmission device

S120

Determining a security key corresponding to the original transmission data, and performing an encryption and decryption processing on the original transmission data through the security key, to obtain the security transmission data

S130

Transmitting the security transmission data to the data transmission device

Transmitting the original transmission data to the security enhancement module

S220

Receiving the security transmission data on which the security enhancement module performs the encryption and decryption processing according to the security key corresponding to the original transmission data

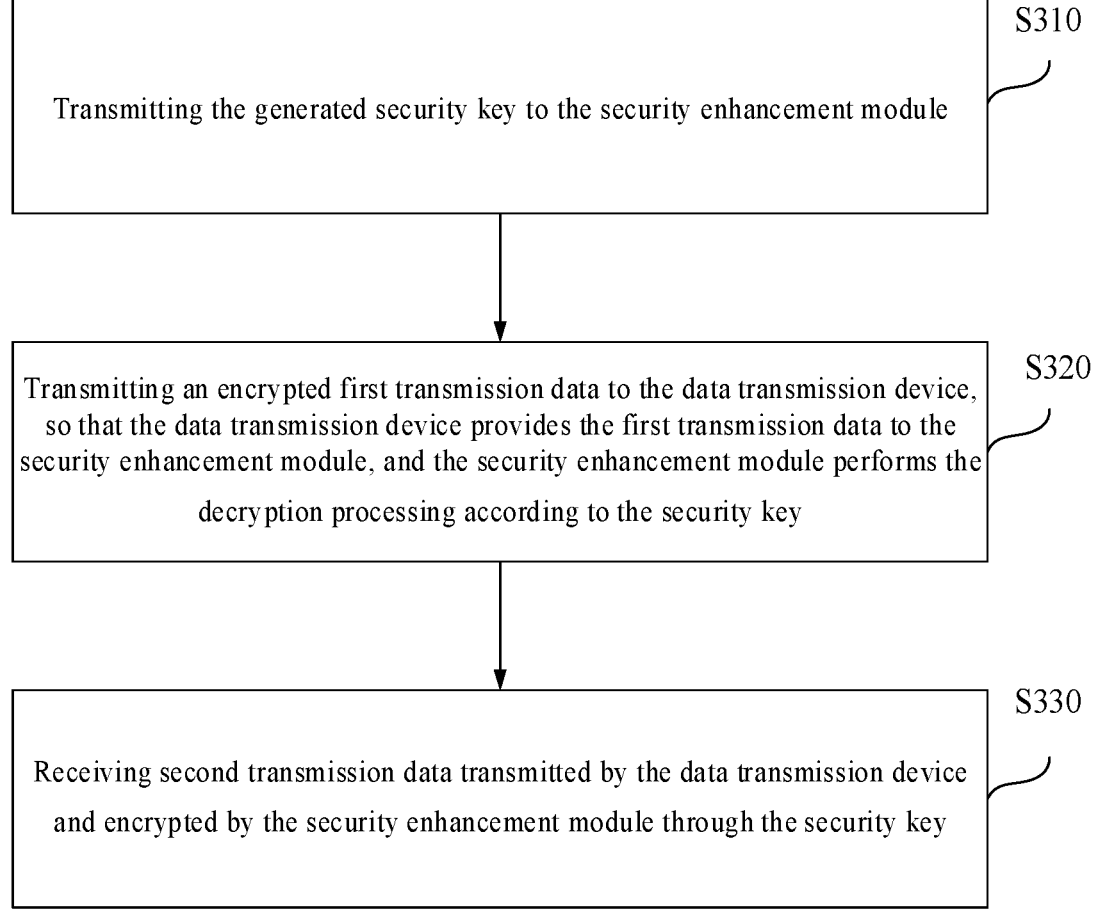

Transmitting the generated security key to the security enhancement module

S310

Transmitting an encrypted first transmission data to the data transmission device, so that the data transmission device provides the first transmission data to the security enhancement module, and the security enhancement module performs the decryption processing according to the security key

S320

Receiving second transmission data transmitted by the data transmission device and encrypted by the security enhancement module through the security key

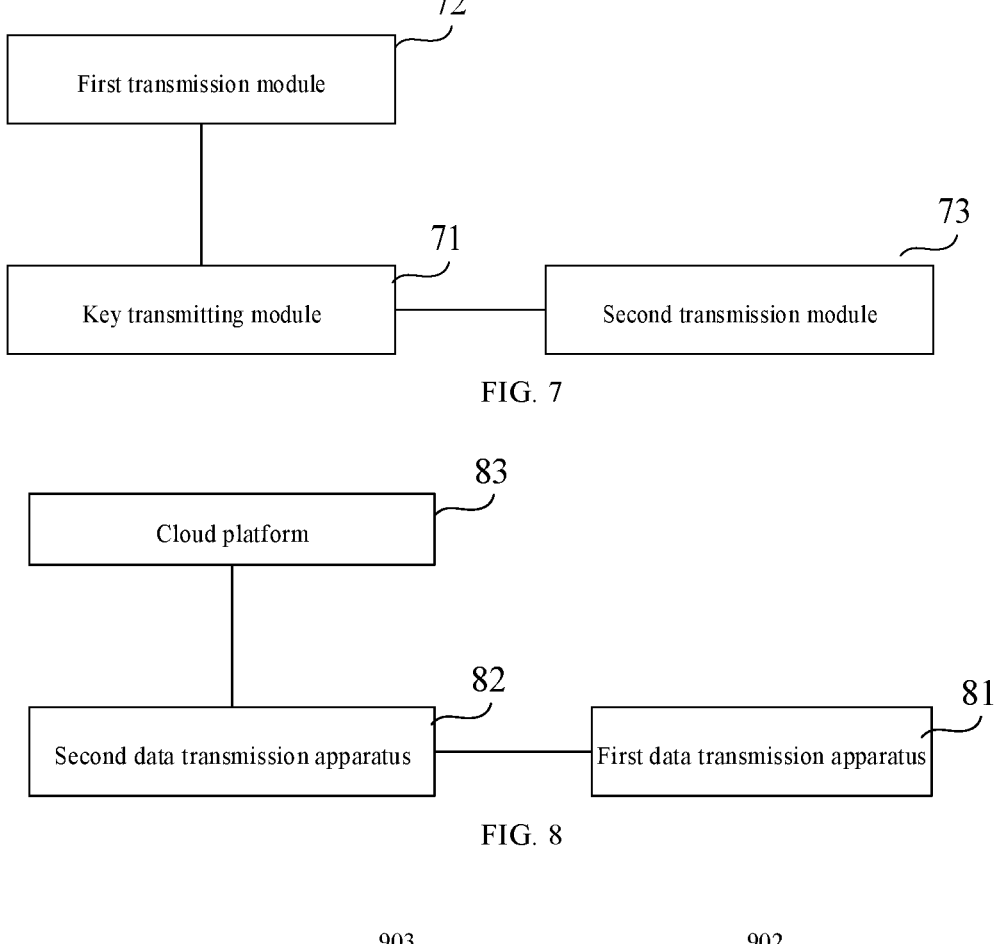
FIG. 7
FIG. 8
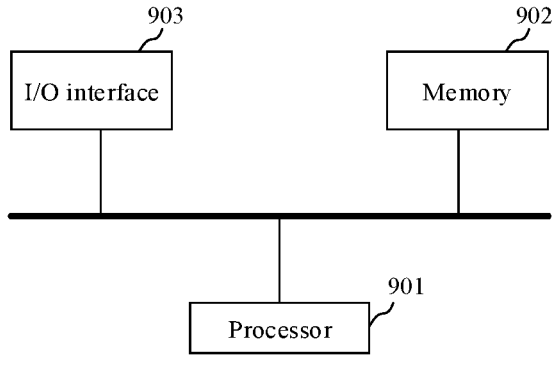
FIG. 9

DATA TRANSMISSION METHOD, APPARATUS, SYSTEM, ELECTRONIC DEVICE AND READABLE MEDIUM

TECHNICAL FIELD

The present disclosure belongs to the technical field of computers, and particularly relates to a data transmission method, an apparatus, a system, an electronic device and a readable medium.

BACKGROUND

In recent years, as the Internet of Everything is coming, it is necessary for more and more external devices to be accessed to a platform of the Internet of Things, and the interconnection and intercommunication therebetween are realized by means of a cloud server. In order to ensure a reliable access of an external device, a device authentication is performed for the external device. Generally, when the device authentication is performed, the external device provides authentication information for the authentication, so that a cloud platform performs an authentication operation according to the authentication information.

However, in the process of implementing the invention, the inventor finds that there are at least following defects in the above way: on one hand, the authentication information is easily forged, so that the authentication reliability is lower; on the other hand, once the external device is attacked, the authentication information is leaked, thereby causing potential safety hazards.

Therefore, in a scene of the Internet of Things in which the external device and the cloud platform communicate with each other, a safer data transmission mode is urgently needed.

SUMMARY

The present disclosure is directed to a data transmission method, an apparatus, a system, an electronic device, and a readable medium.

A first aspect of the present disclosure provides a data transmission method for a security enhancement module, including: receiving original transmission data transmitted by a data transmission device; determining a security key corresponding to the original transmission data, and performing an encryption and decryption processing on the original transmission data through the security key, to obtain security transmission data; and transmitting the security transmission data to the data transmission device; and the original transmission data is transmitted between the data transmission device and a cloud platform, and the security key is obtained from the cloud platform.

In an embodiment, prior to the receiving the original transmission data transmitted by the data transmission device, the method further includes: receiving and storing a platform certificate generated by the cloud platform in response to a device registration request; and adding an auxiliary verification data for the platform certificate in response to an authentication instruction transmitted by the data transmission device, to obtain a module certificate; and transmitting the module certificate to the data transmission device, so that the data transmission device provides the module certificate to the cloud platform for a device authentication; and the receiving the original transmission data transmitted by the data transmission device includes: receiving the original transmission data transmitted by the data transmission device in a case where the device authentication is passed.

In an embodiment, the device registration request is transmitted by the data transmission device; and the device registration request includes: module information of the security enhancement module and device information of the data transmission device; and the platform certificate includes: the module information of the security enhancement module and the device information of the data transmission device.

In an embodiment, the auxiliary verification data includes: timestamp data; and the device information of the data transmission device includes: a device service type and/or a device authentication type; the determining a security key corresponding to a data type of the original transmission data includes: receiving the security key returned by the cloud platform in response to a key negotiation request transmitted by the data transmission device; and the security key is generated according to the device service type and/or the device authentication type.

In an embodiment, the receiving the security key returned by the cloud platform in response to a key negotiation request transmitted by the data transmission device includes: receiving a first key obtained after the cloud platform encrypts the security key through a platform private key; and decrypting the first key through a pre-acquired platform public key, to obtain the security key.

In an embodiment, when the device authentication type is a first authentication type, the security key corresponds to a device identifier; when the device authentication type is a second authentication type, the security key corresponds to a device model; and when the device authentication type is a third authentication type, the security key corresponds to a device service type.

In an embodiment, the platform certificate generated by the cloud platform is a platform certificate in a ciphertext form; and the adding an auxiliary verification data for the platform certificate to obtain a module certificate includes: decrypting the platform certificate in the ciphertext form according to a platform certificate key provided by the cloud platform, to obtain the platform certificate in a plaintext form; adding the auxiliary verification data for the platform certificate in the plaintext form, to obtain a module certificate in the plaintext form; and encrypting the module certificate in the plaintext form through a module certificate key, to obtain the module certificate in the ciphertext form In an embodiment, the platform certificate in the ciphertext form is obtained in a symmetric encryption way; the module certificate in the ciphertext form is obtained in an asymmetric encryption way; and the module certificate key is obtained from the cloud platform.

In an embodiment, the determining a security key corresponding to the original transmission data and the performing an encryption and decryption processing on the original transmission data through the security key, includes: determining a data type of the original transmission data, and determining a security key and an encryption and decryption way according to the data type; and performing the encryption and decryption processing on the original transmission data through the security key and in the encryption and decryption way.

In an embodiment, the data type includes at least one of: a plaintext type, a ciphertext type, a transmitting type, a receiving type, a transmission data type and a security verification type; the security key includes at least one of: a symmetric key, a non-key key, a key acquired from the cloud platform, a locally generated key, an encryption key, a decryption key, a fixed key and a variable key; the encryption and decryption way includes a symmetric encryption way, a symmetric decryption way, an asymmetric encryption way and an asymmetric decryption way.

In an embodiment, the security enhancement module is connected to the data transmission device through a preset interface in the pluggable way, and the security enhancement module communicates with the data transmission device through a preset transmission protocol corresponding to the preset interface; and the preset interface includes a USB interface.

In an embodiment, a data transmission is performed between the security enhancement module and the data transmission device through a preset application interface; and the application interface is provided by a software development kit corresponding to the security enhancement module.

A second aspect of the present disclosure provides a data transmission method for a data transmission device, including: transmitting original transmission data to a security enhancement module; and receiving security transmission data on which the security enhancement module performs an encryption and decryption processing according to a security key corresponding to the original transmission data; and the original transmission data is transmitted between the data transmission device and a cloud platform, and the security key is obtained from the cloud platform.

In an embodiment, prior to the transmitting the original transmission data to the security enhancement module, the method further includes: transmitting a device registration request to the cloud platform, so that the security enhancement module receives and stores a platform certificate generated by the cloud platform in response to the device registration request; transmitting an authentication instruction to the security enhancement module, so that the security enhancement module adds auxiliary verification data for the platform certificate, to obtain a module certificate; and transmitting the received module certificate from the security enhancement module to the cloud platform for a device authentication by the cloud platform; the transmitting the original transmission data to the security enhancement module includes: transmitting the original transmission data to the security enhancement module in a case where the device authentication is passed.

In an embodiment, the device registration request includes: module information of the security enhancement module and device information of the data transmission device; and the platform certificate includes: the module information of the security enhancement module and the device information of the data transmission device; and the auxiliary verification data includes: timestamp data; and the device information of the data transmission device includes: a device service type and/or a device authentication type; the security key corresponding to the original transmission data is generated by the cloud platform according to the device service type and/or the device authentication type; when the device authentication type is a first authentication type, the security key corresponds to a device identifier; when the device authentication type is a second authentication type, the security key corresponds to a device model; and when the device authentication type is a third authentication type, the security key corresponds to a device service type.

In an embodiment, prior to the receiving security transmission data on which the security enhancement module performs an encryption and decryption processing according to a security key corresponding to the original transmission data, the method further includes: transmitting a key negotiation request to the cloud platform; and providing the security key from the cloud platform to the security enhancement module according to a result returned by the cloud platform; and the security key is generated according to the device service type and/or the device authentication type.

In an embodiment, the providing the security key from the cloud platform to the security enhancement module includes: transmitting a first key obtained after the cloud platform encrypts the security key through a platform private key to the security enhancement module, so that the security enhancement module decrypts the first key through a pre-acquired platform public key, to obtain the security key.

In an embodiment, if the original transmission data is data received by the data transmission device from the cloud platform, the transmitting the original transmission data to the security enhancement module includes: performing a protocol conversion processing on the original transmission data received through a platform transmission protocol, and transmitting the original transmission data on which the protocol conversion processing is performed to the security enhancement module; if the original transmission data is local data of the data transmission device, after the receiving security transmission data on which the security enhancement module performs an encryption and decryption processing according to a security key corresponding to the original transmission data, the method further includes: performing a protocol conversion processing on the security transmission data received through a preset transmission protocol, and transmitting the security transmission data on which the protocol conversion processing is performed to the cloud platform.

A third aspect of the present disclosure provides a data transmission method for a cloud platform, including: transmitting a generated security key to a security enhancement module; transmitting an encrypted first transmission data to a data transmission device, so that the data transmission device provides the first transmission data to the security enhancement module, and the security enhancement module performs a decryption processing according to the security key; and/or receiving second transmission data which is transmitted by the data transmission device and encrypted by the security enhancement module through the security key.

In an embodiment, the method further includes: generating a platform certificate according to a received device registration request, and providing the platform certificate to the security enhancement module; receiving a module certificate transmitted by the security enhancement module through the data transmission device; and parsing the module certificate, and performing a device authentication according to a result of the parsing.

In an embodiment, the generating a platform certificate according to a received device registration request includes: acquiring module information of the security enhancement module and device information of the data transmission device in the device registration request, and generating the platform certificate according to the module information of the security enhancement module and the device information of the data transmission device.

In an embodiment, the generating the platform certificate according to the module information of the security enhancement module and the device information of the data transmission device includes: encrypting the module information of the security enhancement module and the device information of the data transmission device, to obtain the platform certificate in a ciphertext form; the parsing the module certificate and performing a device authentication according to a result of the parsing includes: decrypting the received module certificate in the ciphertext form, to obtain the module certificate in a plaintext form; matching the module certificate in the plaintext form with a platform certificate generated in advance; and if the matching is successful, the device authentication is successful.

In an embodiment, the transmitting the generated security key to the security enhancement module includes: acquiring device information corresponding to a key negotiation request in response to the key negotiation request transmitted by the data transmission device, and generating the security key according to the device information, and transmitting the generated security key to the security enhancement module; and the device information includes: a device service type and/or a device authentication type.

In an embodiment, the transmitting the generated security key to the security enhancement module includes: encrypting the security key through a platform private key, to obtain a first key; and transmitting the first key to the security enhancement module through the data transmission device, so that the security enhancement module decrypts the first key through a pre-acquired platform public key, to obtain the security key.

A fourth aspect of the present disclosure provides a data transmission apparatus, including: a receiving module configured to receive original transmission data transmitted by a data transmission device; an encryption and decryption module configured to determine a security key corresponding to the original transmission data, and perform an encryption and decryption processing on the original transmission data through the security key, to obtain security transmission data; and a transmitting module configured to transmit the security transmission data to the data transmission device; the original transmission data is transmitted between the data transmission device and a cloud platform, and the security key is obtained from the cloud platform.

A fifth aspect of the present disclosure provides a data transmission apparatus, including: a transmitting module configured to transmit original transmission data to a security enhancement module; and a receiving module configured to receive a security transmission data on which the security enhancement module performs an encryption and decryption processing according to a security key corresponding to the original transmission data; the original transmission data is transmitted between the data transmission device and a cloud platform, and the security key is obtained from the cloud platform.

A sixth aspect of the present disclosure provides a cloud platform, including: a key transmitting module configured to transmit a generated security key to a security enhancement module; a first transmission module configured to transmit an encrypted first transmission data to a data transmission device, so that the data transmission device provides the first transmission data to the security enhancement module, so that the security enhancement module performs a decryption processing according to the security key; and/or a second transmission module configured to receive second transmission data which is transmitted by the data transmission device and encrypted by the security enhancement module through the security key.

A seventh aspect of the present disclosure provides a data transmission system, including: the data transmission apparatus of the fourth aspect, the data transmission apparatus of the fifth aspect, and the cloud platform of the sixth aspect.

An eighth aspect of the present disclosure provides an electronic device, including: one or more processors; a memory having one or more programs stored thereon that, when executed by the one or more processors, cause the one or more processors to implement the method of any one of the above embodiments; one or more I/O interfaces connected between the one or more processors and the memory and configured to enable information interaction between the one or more processors and the memory.

A ninth aspect of the present disclosure provides a computer readable medium having stored thereon a computer program which, when executed by a processor, implements the method of any one of the above embodiments.

BRIEF DESCRIPTION OF DRAWINGS

The accompanying drawings, which are provided for further understanding of the present disclosure and constitute a part of this specification, are for explaining the present disclosure together with the embodiments of the present disclosure, but are not intended to limit the present disclosure. In the drawings:

FIG. 1 is a flowchart of a data transmission method applied to a security enhancement module according to an embodiment of the present disclosure;

FIG. 3 is a flowchart of a data transmission method applied to a cloud platform according to an embodiment of the present disclosure;

FIG. 7 is a block diagram of a cloud platform according to an embodiment of the present disclosure;

FIG. 8 is a block diagram of a data transmission system according to an embodiment of the present disclosure; and FIG. 9 is a functional block diagram of an electronic device according to an embodiment of the present disclosure.

DETAIL DESCRIPTION OF EMBODIMENTS

Figure 2:
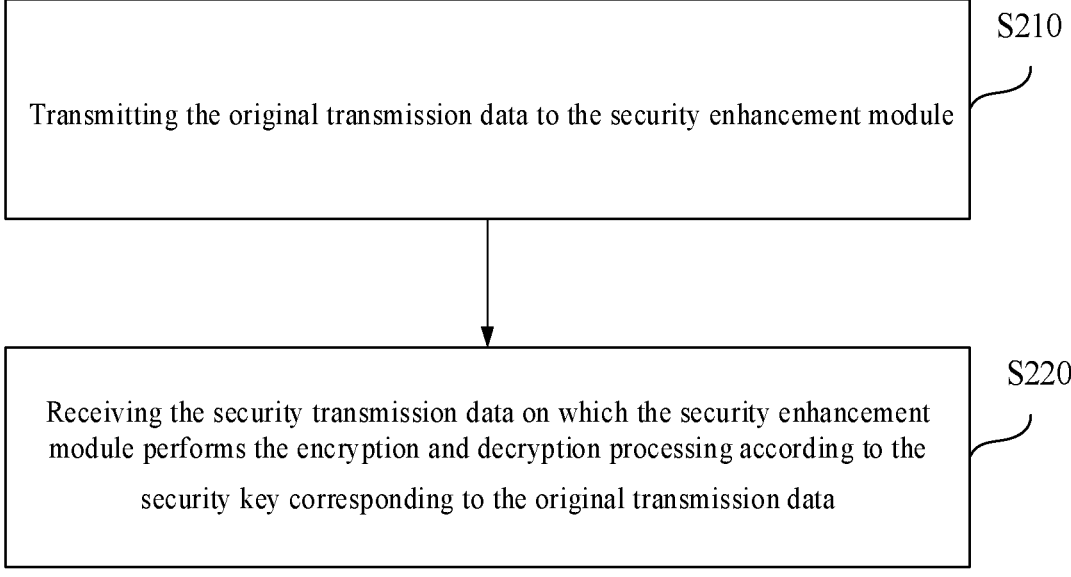
FIG. 2 is a flowchart of a data transmission method applied to a data transmission device according to an embodiment of the present disclosure.

In order to enable one of ordinary skill in the art to better understand the technical solutions of the present disclosure/ utility model, the present disclosure/utility model will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items.

The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

In a first aspect, an embodiment of the present disclosure provides a data transmission method, which improves reliability of data transmission through a security enhancement module, and avoids a data leakage caused by an attack on an external device.

As shown in FIG. 1, the data transmission method provided in the embodiment of the present disclosure may be applied to the security enhancement module. The security enhancement module may be connected to a data transmission device in a plug-in mode, and the data transmission device communicates with a cloud platform. The method includes following steps:

Step S110: receiving original transmission data transmitted by the data transmission device.

The original transmission data is transmitted between the data transmission device and the cloud platform. The data transmission device may be various types of external devices, the original transmission data may be data transmitted to the data transmission device by the cloud platform, or may also be data generated by the data transmission device and transmitted to the cloud platform. A data type and a data source of the original transmission data are not limited in the present disclosure.

Step S120: determining a security key corresponding to the original transmission data, and performing an encryption and decryption processing on the original transmission data through the security key, to obtain the security transmission data.

The security key is obtained from the cloud platform. If the original transmission data is data transmitted to the data transmission device by the cloud platform, the original transmission data is usually in an encrypted state, so that it is necessary to perform a decryption processing through the security key to obtain the security transmission data in a decrypted state. If the original transmission data is data generated by the data transmission device and transmitted to the cloud platform, the original transmission data is usually in an unencrypted state, so that it is necessary to perform an encryption processing through the security key to obtain the security transmission data in the encrypted state.

Step S130: transmitting the security transmission data to the data transmission device.

The security enhancement module transmits the security transmission data after the encryption processing or the decryption processing to the data transmission device for subsequent processing by the data transmission device.

As shown in FIG. 2, the data transmission method provided in the embodiment of the present disclosure may be applied to a data transmission device. The method includes:

Step S210: transmitting the original transmission data to the security enhancement module.

The original transmission data is transmitted between the data transmission device and the cloud platform. The data transmission device may be various types of external devices, the original transmission data may be data transmitted to the data transmission device by the cloud platform, or may also be data generated by the data transmission device and transmitted to the cloud platform. A data type and a data source of the original transmission data are not limited in the present disclosure.

Step S220: receiving the security transmission data on which the security enhancement module performs the encryption and decryption processing according to the security key corresponding to the original transmission data.

The security key is obtained from the cloud platform. If the original transmission data is data transmitted to the data transmission device by the cloud platform, the original transmission data is usually in an encrypted state, so that it is necessary to perform a decryption processing through the security key to obtain the security transmission data in a decrypted state. If the original transmission data is data generated by the data transmission device and transmitted to the cloud platform, the original transmission data is usually in an unencrypted state, so that it is necessary to perform an encryption processing through the security key to obtain the security transmission data in the encrypted state.

As shown in FIG. 3, the data transmission method provided by the embodiment of the present disclosure may be applied to a cloud platform. The method includes:

Step S310: transmitting the generated security key to the security enhancement module.

The security key may be generated in a variety of ways. For example, the cloud platform and the data transmission device may perform a key negotiation operation to obtain the security key. For another example, the security key may also be determined according to a device type of the data transmission device, so that the security key is transmitted to the security enhancement module through the data transmission device.

Step S320: transmitting an encrypted first transmission data to the data transmission device, so that the data transmission device provides the first transmission data to the security enhancement module, and the security enhancement module performs the decryption processing according to the security key.

The cloud platform transmits the encrypted first transmission data to the data transmission device, so that the data transmission device provides the first transmission data to the security enhancement module, and correspondingly, the security enhancement module performs the decryption processing according to the security key provided by the cloud platform.

Step S330: receiving second transmission data transmitted by the data transmission device and encrypted by the security enhancement module through the security key.

The cloud platform receives the encrypted second transmission data transmitted by the data transmission device, and encrypted by the security enhancement module through the security key provided by the cloud platform.

One of the step S320 and the step S330 may be performed. Alternatively, the step S320 and the step S330 may also be performed simultaneously or alternately, which is not limited in the present disclosure.

Therefore, the encryption and decryption operation may be performed by the security enhancement module on the transmission data between the cloud platform and the data transmission device. The encryption process and the decryption process are all implemented inside the security enhancement module, and the security key is obtained from the cloud platform in the key negotiation way, so that potential safety hazards caused by the unreliable data transmission device are avoided, and the data security is improved.

Figure 4:
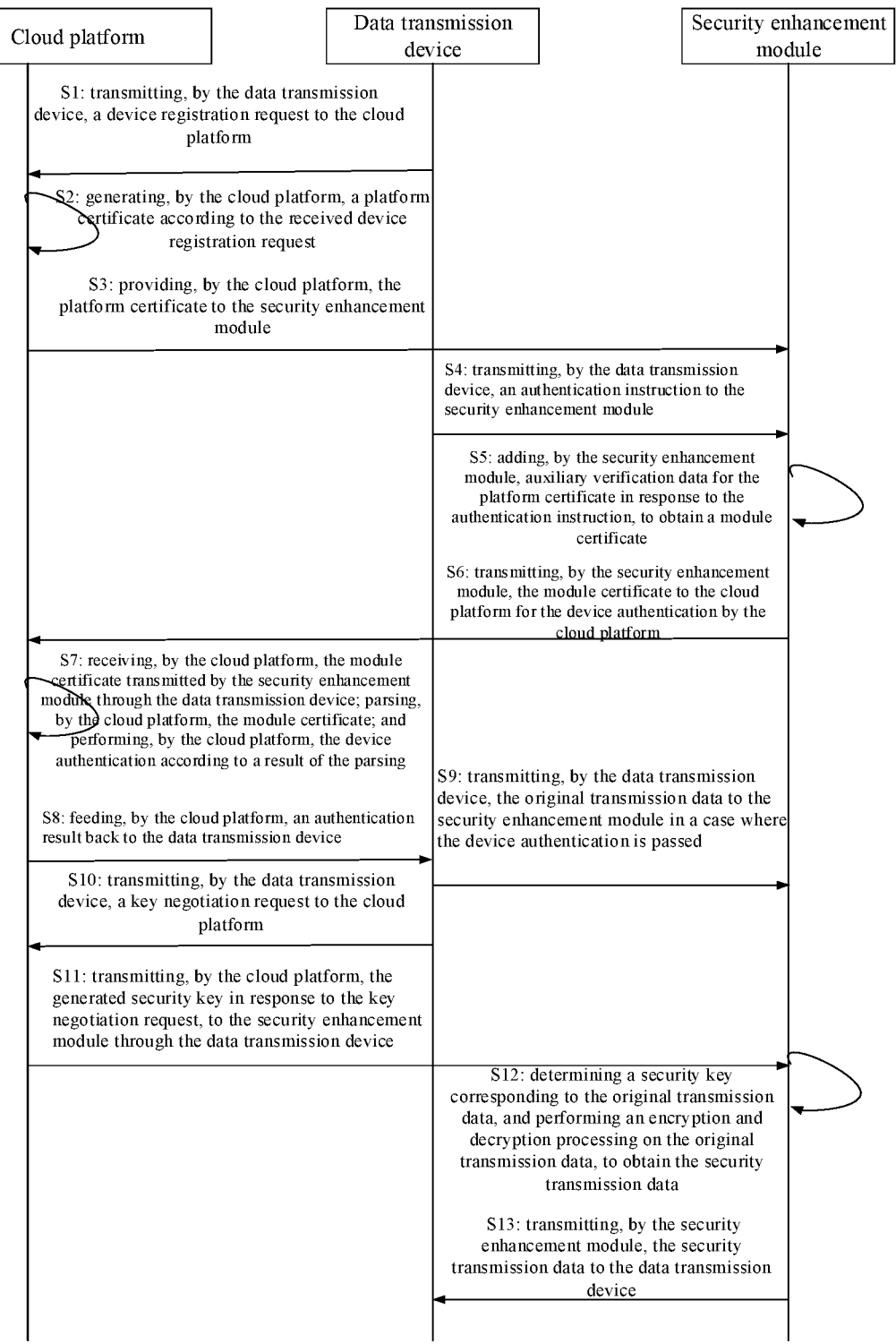
FIG. 4 is a flowchart of a data transmission method applied to a security enhancement module, a data transmission device, and a cloud platform according to an embodiment of the present disclosure.

As shown in FIG. 4, the data transmission method provided by the embodiment of the present disclosure is used for implementing data interaction among the cloud platform, the data transmission device, and the security enhancement module.

The data transmission device may be various types of external devices used for accessing the cloud platform, such as the internet of things or the like, and include various types of devices, such as a conference device and a security and protection device or the like. The external device is numerous, comes from various types of sources, and has different types, so that if a safety inspection is performed on external devices one by one, undoubtedly, it will consume a large amount of time costs, and easily cause the potential safety hazards due to problems, such as a missing inspection or the like. Therefore, in the application scenario of the embodiment, the data transmission device has the characteristics of coming from a wide range of sources, difficulty in the safety inspection or the like.

In order to implement a security verification for the data transmission device conveniently, quickly, safely and efficiently, in this embodiment, the security enhancement module is provided. The encryption and decryption process for the sensitive data is realized through the security enhancement module, so that the sensitive data is prevented from leaking, and the communication security is improved in the scene where the data transmission device is unreliable.

The security enhancement module may communicate with the data transmission device in various ways. For example, the security enhancement module may be connected to the data transmission device by wire or wirelessly. In an optional implementation, in order to improve the flexibility of setting the security enhancement module, the security enhancement module is plugged and connected with the data transmission device in a pluggable way, so as to implement the communication therebetween. For example, in one implementation, the security enhancement module may be connected to the data transmission device via a USB interface, or via an internal data bus, such as PICE/LVDS/I2C/UART, or the like. For another example, in another implementation, the security enhancement module may be inserted into the data transmission device as a security chip (FPGA), and thus, be connected to a system on chip (SOC) through an internal data bus, so as to implement the communication with the data transmission device. In summary, the present disclosure does not limit a specific access form of the security enhancement module, as long as the security enhancement module may be flexibly and conveniently communicated with the data transmission device.

Therefore, the security enhancement module may replace the data transmission device to realize the encryption and decryption for the data, the data verification and the like, thereby improving the security. In order to prevent an unreliable device from accessing the cloud platform, in this embodiment, prior to the data transmission, a device registration operation and a device authentication operation are performed firstly. In a case where the device authentication passes, the data transmission is performed, so that a suspected device is effectively prevented from accessing the cloud platform.

As shown in FIG. 4, the method includes following steps:

Step S1: transmitting, by the data transmission device, a device registration request to the cloud platform.

The device registration request is used for registering relevant information of the data transmission device on the cloud platform. In addition, in the device registration process, it is necessary for the cloud platform to record not only device information of the data transmission device, but also module information of the security enhancement module associated with the data transmission device. Correspondingly, in the subsequent device authentication process, a legality of the data transmission device and a legality of the security enhancement module are verified so as to ensure the reliable access of the device.

In a first application scenario, the security enhancement module is pre-allocated to the data transmission device, and correspondingly, the device registration request transmitted by the data transmission device includes: the module information of the security enhancement module and the device information of the data transmission device. The module information of the security enhancement module is used for uniquely identifying one security enhancement module, and may be, for example, an ID identification of the security enhancement module. The device information of the data transmission device is used for describing device characteristics of the data transmission device. For example, the device information includes: a device service type and/or a device authentication type. The device service type is used for describing service types of the data transmission device, such as a conference type, a security type or the like. The device service type may also be a gateway type, a lighting type, a camera type or the like. The device authentication type is used for describing an authentication way for the device, and may be specifically set by a security level of the device. In this way, the data transmission device transmits the device registration request, so that the correspondence between the data transmission device and the security enhancement module may be flexibly adjusted, which easily realize a flexible pairing between the security enhancement module and the data transmission device with a higher flexibility.

In a second application scenario, the security enhancement module is not pre-allocated to the data transmission device, and correspondingly, upon receiving the device registration request, the cloud platform allocates the corresponding security enhancement module to the data transmission device. At this time, the device registration request transmitted by the data transmission device includes the device information of the data transmission device, but does not include the module information of the security enhancement module. In this way, the security enhancement module is allocated directly by the cloud platform, so that the correspondence between the security enhancement module and the data transmission device is set by the cloud platform in advance, and cannot be changed randomly in the later period, which has a higher security.

In practical situations, at least one of the two ways may be flexibly selected according to characteristics of a specific service scene.

Step S2: generating, by the cloud platform, a platform certificate according to the received device registration request.

The cloud platform acquires the module information of the security enhancement module and the device information of the data transmission device in the device registration request, and generates a platform certificate according to the module information of the security enhancement module and the device information of the data transmission device. Optionally, when the platform certificate is generated according to the module information of the security enhancement module and the device information of the data transmission device, the module information of the security enhancement module and the device information of the data transmission device are further encrypted to obtain the platform certificate in a ciphertext form.

In the first application scenario, the cloud platform parses the device registration request, obtains the module information of the security enhancement module and the device information of the data transmission device in the device registration request, performs an encryption operation on the module information of the security enhancement module and the device information of the data transmission device through a platform certificate key (such as a key A), and obtains the platform certificate according to an encryption result. To improve an efficiency of performing the encryption, the encryption operation may be a symmetric encryption operation. For example, an AES encryption algorithm may be used. Therefore, a plaintext of the platform certificate includes the module information of the security enhancement module and the device information of the data transmission device. The security in the transmission process can be improved through the encryption operation.

In the second application scenario, the cloud platform parses the device registration request, obtains the device information of the data transmission device in the device registration request, and allocates a corresponding security enhancement module according to a type of the data transmission device. An encryption operation is performed on the module information of the allocated security enhancement module and the device information of the data transmission device through a platform certificate key (such as a key A), to obtain the platform certificate according to an encryption result. In this way, the security enhancement module is allocated by the cloud platform according to the device information in the device registration request.

Optionally, when the data transmission device includes various device types, different types of the security enhancement module may be provided for the various types of the data transmission device. Correspondingly, the cloud platform selects a security enhancement module matching with a device type of a current device for allocation, according to the device information in the device authentication request.

Step S3: providing, by the cloud platform, the platform certificate to the security enhancement module.

In the step, the cloud platform may provide the platform certificate to the security enhancement module through the data transmission device, or may directly provide the platform certificate to the security enhancement module. Accordingly, the security enhancement module receives and stores the platform certificate generated by the cloud platform in response to the device registration request. For example, in the above first application scenario, the cloud platform transmits the platform certificate to the data transmission device, and the data transmission device provides the platform certificate and a platform certificate key to the security enhancement module. In the above second application scenario, the cloud platform directly provides the platform certificate and the platform certificate key to the security enhancement module. In the above first application scenario, the platform certificate stored in the security enhancement module is dynamically added, so that different data transmission devices can be dynamically adapted, and the flexibility is improved. In the above second application scenario, the platform certificate and the platform certificate key can be directly burned in the security enhancement module, so that the security is further improved.

In addition, no matter which way is adopted, the cloud platform needs to record the correspondence between the module information of the security enhancement module and the device information of the data transmission device, so that the security is further improved in the subsequent authentication process by means of the correspondence, and potential safety hazards caused by malicious replacement of the data transmission device or the security enhancement module are prevented.

Step S4: transmitting, by the data transmission device, an authentication instruction to the security enhancement module.

The data transmission device actively initiates a device authentication operation, so that the authentication instruction is transmitted to the security enhancement module.

Step S5: adding, by the security enhancement module, auxiliary verification data for the platform certificate in response to the authentication instruction, to obtain a module certificate.

The security enhancement module adds the auxiliary verification data for the stored platform certificate in response to the authentication instruction transmitted by the data transmission device, to obtain the module certificate. The auxiliary verification data includes various additional data capable of realizing an auxiliary verification function, such as timestamp data, device fingerprint data or the like.

Optionally, in order to improve the security, the platform certificate generated by the cloud platform is a platform certificate in the ciphertext form. Firstly, the security enhancement module decrypts the platform certificate in the ciphertext form according to the platform certificate key (such as the key A) provided by the cloud platform, to obtain the platform certificate in a plaintext form. When the platform certificate is obtained in a symmetric encryption way, the platform certificate key for decryption is the same as that used in the encryption performed by the cloud platform, so that the decryption can be realized at a higher speed. Alternatively, in other application scenarios with a higher security, the encryption and decryption process may be realized in an asymmetric encryption and decryption way.

Then, the auxiliary verification data is added to the platform certificate in the plaintext form, to obtain the module certificate in the plaintext form. For example, the security enhancement module obtains an internal system time, generates timestamp data according to the internal system time, and adds the timestamp data to the platform certificate, to obtain the module certificate. This process is substantially equivalent to a certificate reorganization process, through which the security can be further increased by means of the auxiliary verification data. For example, if the timestamp data is tampered, it indicates that the certificate has been attacked during transmission.

Finally, the module certificate in the plaintext form is encrypted through a module certificate key, to obtain the module certificate in the ciphertext form. In an optional implementation, the platform certificate in the ciphertext form is obtained in a symmetric encryption way; the module certificate in the ciphertext form is obtained in an asymmetric encryption way; and the module certificate key is obtained from the cloud platform. The module certificate in the ciphertext form is obtained in the asymmetric encryption way, so that the transmission safety of the module certificate can be improved.

The module certificate key may be obtained in a variety of ways. For example, in one implementation, a communication request (also called a request for acquiring the module certificate key) is transmitted by the security enhancement module to the cloud platform through the data transmission device. The cloud platform generates a module certificate private key b stored in the cloud platform and a module certificate public key B forwarded to the security enhancement module through the data transmission device according to the received communication request. The module certificate public key B is the module certificate key. Therefore, the asymmetric encryption and decryption are realized by the module certificate private key b and the module certificate public key B.

In addition, it should be noted that in this embodiment, the security enhancement module is connected to the data transmission device through a preset interface in the pluggable way, and the security enhancement module communicates with the data transmission device through a preset transmission protocol (i.e., a first transmission protocol) corresponding to the preset interface. The preset interface includes a USB interface, and the preset transmission protocol includes a USB protocol. In addition, the data transmission device and the cloud platform communicate with each other through a platform transmission protocol, such as a message queuing telemetry transport (MQTT) protocol. The MQTT protocol is an unencrypted protocol based on TCP, and is a message protocol based on a publishing/subscribing paradigm under an ISO standard (ISO/IEC PRF 20922), and operates in a TCP/IP protocol family, and is a publishing/subscribing message protocol designed for a remote device with a low hardware performance and designed in the case of a poor network condition. Therefore, the MQTT protocol is used as a message middleware through which the data transmission device and the cloud platform communicate with each other. The MQTT protocol is a client-server based message publishing/subscribing transport protocol. The MQTT protocol is lightweight, simple, open, and is easily implemented, so that the MQTT protocol has a very wide application range. In many cases (including in restricted environments, such as a machine to machine (M2M) communication and an internet of things (IoT)), the MQTT protocol has been widely used in a sensor for communicating with other sensors via a satellite link, a medical device occasionally dialed, a smart home, and some miniaturized devices.

Correspondingly, the data transmission device needs to perform a protocol conversion operation. After the protocol conversion is performed on the data received from the security enhancement module through the first transmission protocol, the data is transmitted to the cloud platform through a second transmission protocol. After the protocol conversion is performed on the data received from the cloud platform through the second transmission protocol, the data is transmitted to the security enhancement module through the first transmission protocol. Therefore, in this step, the data transmission device needs to perform a protocol conversion on a communication request from the security enhancement module, so that the communication request is converted from the USB protocol to the MQTT protocol, and then transmitted to the cloud platform. After receiving the module certificate public key B transmitted by the cloud platform through the MQTT protocol, the protocol conversion is performed on the module certificate public key B, and the converted module certificate public key B is transmitted to the security enhancement module through the USB protocol.

Step S6: transmitting, by the security enhancement module, the module certificate to the cloud platform for the device authentication by the cloud platform.

The security enhancement module transmits the module certificate to the data transmission device, and then, the data transmission device transmits the module certificate to the cloud platform for the device authentication. Correspondingly, the data transmission device transmits the module certificate received from the security enhancement module to the cloud platform for the device authentication by the cloud platform.

In one implementation, the security enhancement module transmits the module certificate in the ciphertext form to the data transmission device through the USB protocol, and the data transmission device transmits the module certificate in the ciphertext form to the cloud platform through the MQTT protocol.

Step S7: receiving, by the cloud platform, the module certificate transmitted by the security enhancement module through the data transmission device; parsing, by the cloud platform, the module certificate; and performing, by the cloud platform, the device authentication according to a result of the parsing.

Optionally, when the module certificate is in the ciphertext form, the cloud platform decrypts the received module certificate in the ciphertext form, to obtain the module certificate in the plaintext form; matches the module certificate in the plaintext form with a platform certificate generated in advance. If the module certificate in the plaintext form successfully matches with the platform certificate generated in advance, the device authentication is successful. The module certificate in the ciphertext form may be asymmetrically decrypted by the above module certificate private key b.

The module certificate in the plaintext form includes: the auxiliary verification data and the platform certificate in the plaintext form obtained through the parsing by the security enhancement module. Generally, the module information of the security enhancement module and the device information of the data transmission device, which are contained in the platform certificate in the plaintext form obtained through the parsing by the security enhancement module, are consistent with the relevant information in the platform certificate generated in advance by the cloud platform. Therefore, if the module certificate in the plaintext form successfully matches with the platform certificate generated in advance, the device authentication is successful; and if the module certificate in the plaintext form does not successfully match with the platform certificate generated in advance, the device authentication fails.

In one example, a cloud effectively extracts information of a decrypted module certificate plaintext, for example, extracts an ID identifier inside the security enhancement module. That is, a unique ID inside the security enhancement module is used as a unique reliable root of the data transmission device on the cloud platform. Correspondingly, the cloud platform compares the unique ID inside the security enhancement module extracted by the platform with a reliable root stored in the cloud in a comparison process. If the comparison is successful, the authentication is successful, and otherwise, the authentication fails. The cloud platform transmits the authentication result in the plaintext form to the data transmission device through the MQTT protocol, and the data transmission device transmits the authentication result to a security module through the USB protocol. In this example, the cloud platform only compares the module information of the security enhancement module. The authentication is successful as long as the module information of the security enhancement module is successfully matched.

In order to improve the security, in other examples, the cloud platform not only performs a comparison on the module information of the security enhancement module but also performs a comparison on the device information of the data transmission device. Only when a combination relationship between the module information of the security enhancement module and the device information of the data transmission device is consistent with that pre-stored in the cloud platform, the authentication is successful. In this way, the authentication is performed through the combination relationship between the module information of the security enhancement module and the device information of the data transmission device. If any of the data transmission device or the security enhancement module is changed, the authentication fails, so that the security is improved.

Step S8: feeding, by the cloud platform, an authentication result back to the data transmission device.

Step S9: transmitting, by the data transmission device, the original transmission data to the security enhancement module in a case where the device authentication is passed.

The step at least includes following two cases:

In a first case, the cloud platform transmits the encrypted first transmission data to the data transmission device, and accordingly, the data transmission device provides the encrypted first transmission data to the security enhancement module. That is, the original transmission data is: the first transmission data transmitted by the cloud platform to the data transmission device.

In a second case, the data transmission device needs to transmit to-be-transmitted unencrypted original transmission data to the cloud platform. In order to improve the security, the unencrypted original transmission data is transmitted to the security enhancement module for encrypting, to obtain second transmission data. The second transmission data is transmitted to the data transmission device by the security enhancement module and then transmitted to the cloud platform by the data transmission device. Correspondingly, the cloud platform receives the second transmission data which is transmitted by the data transmission device and obtained by encrypting the unencrypted original transmission data by the security enhancement module through a security key.

Step S10: transmitting, by the data transmission device, a key negotiation request to the cloud platform.

The step may be performed before the step S9, and the timing of performing the step is not limited in the present disclosure. In addition, the step may also be performed multiple times in the subsequent data transmission process. That is, a key negotiation request is acquired from the cloud platform once every a preset time period, so as to replace the security key, thereby improving the security. The specific time and frequency of performing the step may be flexibly set according to the service scene.

Optionally, a frequency of transmitting the key negotiation request is determined according to the above device service type and/or the device authentication type in the device information of the data transmission device. For example, if the security level of the device is determined to be higher according to the device service type and/or the device authentication type, the frequency of transmitting the key negotiation request needs to be increased; otherwise, the frequency of transmitting the key negotiation request is reduced. In a word, the frequency of transmitting the key negotiation request is determined according to the device service type and/or the device authentication type, so that various service scenes can be flexibly adapted.

Step S11: transmitting, by the cloud platform, the generated security key in response to the key negotiation request, to the security enhancement module through the data transmission device.

The cloud platform acquires device information corresponding to the key negotiation request, generates a security key according to the device information, and transmits the generated security key to the security enhancement module. The device information includes the above device service type and/or device authentication type. Correspondingly, the data transmission device provides the security key from the cloud platform to the security enhancement module according to a result returned by the cloud platform.

In one implementation, the security key corresponds to the device identification when the device authentication type is a first authentication type (e.g., a one-machine-one-key type). In the first authentication type, one key is generated for each device. The device is unique, so that the security is higher.

The security key corresponds to a device model when the device authentication type is a second authentication type (e.g., a one-type-one-key type). In the second authentication type, one key is generated for each device model. The same model may contain a plurality of devices, so that the security of the security key in the second authentication type is slightly lower than that of the security key in the first authentication type.

The security key corresponds to a device service type when the device authentication type is a third authentication type (e.g., a uniform key). In the third authentication type, a uniform security key is generated for all devices, and thus, has a lowest security. For example, a same security key may be generated for data transmission devices of the same service type.

The device authentication type and the way of generating the security key specifically depend on factors such as the data type in the service scene, which are not limited in the present disclosure.

Therefore, the frequency of transmitting the key negotiation request (i.e., a frequency of replacing the security key) and the way of generating the security key in the present disclosure can be flexibly adjusted according to an actual service requirement, so that the security requirement of various data transmission services can be fully met.

Optionally, in order to further improve the security and avoid a security problem caused by malicious interception of the security key in a transmission process, in an implementation, the cloud platform encrypts a generated security key through a platform private key, to obtain a first key; and transmits the first key to the security enhancement module through the data transmission device. The data transmission device transmits the first key obtained by encrypting the security key by the cloud platform through the platform private key to the security enhancement module. Correspondingly, the security enhancement module receives the first key obtained by encrypting the security key by the cloud platform through the platform private key; and decrypts the first key through a pre-acquired platform public key, to obtain the security key. The platform public key and the platform private key are both generated by the cloud platform, and the cloud platform provides the platform public key to the security enhancement module in advance. The way of generating the platform public key and the platform private key may be flexibly set. For example, the platform public key may be the same as the above module certificate public key B, and the platform private key may be the same as the above module certificate private key b. In addition, the security key is asymmetrically encrypted by the platform private key, to obtain the first key (i.e., the security key in the ciphertext form). The first key is decrypted asymmetrically through the platform public key, to obtain the security key. The asymmetric encryption and decryption way can improve the security.

The security key is transmitted to the data transmission device through the MQTT protocol, and the data transmission device performs the protocol conversion on the security key, and then transmits the converted security key to the security enhancement module through the USB protocol.

Step S12: determining, by the security enhancement module, a security key corresponding to the original transmission data, and performing, by the security enhancement module, an encryption and decryption processing on the original transmission data through the security key, to obtain the security transmission data.

The security key is obtained through the key negotiation operation in the above steps. In addition, the security enhancement module further determines a data type of the original transmission data, and determines the security key and the encryption and decryption way according to the data type; and performs the encryption and decryption processing on the original transmission data through a security key and the encryption and decryption way. The data type includes at least one of: a plaintext type, a ciphertext type, a transmitting type, a receiving type, a transmission data type and a security verification type. The security key includes at least one of: a symmetric key, a non-key key, a key acquired from the cloud platform, a locally generated key, an encryption key, a decryption key, a fixed key and a variable key. The encryption and decryption way includes: a symmetric encryption way, a symmetric decryption way, an asymmetric encryption way and an asymmetric decryption way. For example, when the original transmission data is encrypted first transmission data transmitted by the cloud platform to the data transmission device, that is, the data type is the ciphertext type and the receiving type, a decryption operation is performed. When the original transmission data is data to be transmitted to the cloud platform by the data transmission device, that is, the data type is the plaintext type and the transmitting type, an encryption operation is performed.

In the above first case, the original transmission data is: first transmission data transmitted by the cloud platform to the data transmission device. Correspondingly, the security enhancement module decrypts the first transmission data through the security key.

In the above second case, the original transmission data is unencrypted original transmission data to be transmitted to the cloud platform by the data transmission apparatus. Correspondingly, the security enhancement module encrypts the original transmission data through the security key.

In addition, the security key may be obtained by: receiving a security key returned by the cloud platform in response to the key negotiation request transmitted by the data transmission device. The cloud platform transmits the security key to the data transmission device, and then the data transmission device transmits the security key to the security enhancement module.

Optionally, in order to improve the security, the cloud platform encrypts the security key through the platform private key, to obtain the first key. Accordingly, the security key is obtained by: receiving the first key obtained after the cloud platform encrypts the security key through the platform private key; and decrypting the first key through the pre-acquired platform public key, to obtain the security key.

Step S13: transmitting, by the security enhancement module, the security transmission data to the data transmission device.

The security enhancement module may transmit the security transmission data to the data transmission device through the USB protocol. Correspondingly, the data transmission device receives the security transmission data obtained after the security enhancement module performs the encryption and decryption processing according to the security key corresponding to the original transmission data.

In the above first case, the original transmission data is the first transmission data transmitted by the cloud platform to the data transmission device, and therefore, the data transmission device processes the decrypted first transmission data. In the above second case, the data transmission device performs the protocol conversion process on the security transmission data, to transmit the data to the cloud platform through the MQTT protocol.

Therefore, in this embodiment, the data transmission device needs to perform a corresponding protocol conversion processing according to the data type: if the original transmission data is the data received by the data transmission device from the cloud platform, the data transmission device performs the protocol conversion processing on the original transmission data (converted into the USB protocol) received through the platform transmission protocol (such as, the MQTT protocol), and transmits the original transmission data on which the protocol conversion processing is performed to the security enhancement module. If the original transmission data is local data of the data transmission device, the data transmission device performs the protocol conversion processing on the security transmission data received through a preset transmission protocol (such as the USB protocol), and transmits the security transmission data (converted into the MQTT protocol) on which the protocol conversion processing is performed to the cloud platform.

In this embodiment, a transmission protocol between the data transmission device and the cloud platform is different from that between the data transmission device and the security enhancement module, so that the data transmission device needs to perform the protocol conversion processing on the data to be received or to be transmitted. In addition, different transmission protocols are adopted among different devices, and the network attacks among the devices can be avoided, thereby improving the security.

In summary, the present embodiment mainly includes the device registration process (steps S1, S2, S3), the device authentication process (steps S4, S5, S6, S7, S8), the key negotiation process (steps S10, S11), and a data interactive transmission process (steps S9, S12, S13). The device registration process and the device authentication process are mainly used for verifying the identity of the device, so that the key negotiation process and the data interactive transmission may be performed after the device registration process and the device authentication process are completed. In addition, the key negotiation process and the data interactive transmission process may be performed successively or alternately. The key negotiation process and the data interactive transmission process may be performed several times. The key negotiation process is performed several times, so that the security key can be dynamically changed, and therefore the security is improved.

For ease of understanding, respective processes will be described below in detail:

I. The Device Registration: A Registration and a Generation of a Certificate on a Device Side (i.e., the Data Transmission Device) on an IoT Platform The device registration process is mainly implemented by the cloud platform and specifically includes following steps:

A first step, i.e., the device registration: the user is required to provide information such as a device number, a device type, etc. The device number may be the unique ID of the security enhancement module, that is, the registration of the device is completed through the unique ID of the security enhancement module. The device number is backed up at the cloud. The device type includes a gateway type, a lighting type, a camera type or the like, which is not limited in the present disclosure.

A second step, i.e., the selection of an authentication type, includes the one-machine-one-key type, the one-type-one-key type and the uniform key. For the one-machine-one-key type, a key is generated for a single device. For the one-type-one-key type, a key is generated for devices having a same type. For the uniform key, a key is generated for all devices. The authentication type is not limited in the present disclosure. The key generated in this step is denoted as an authentication key (i.e., the platform certificate key and/or the module certificate key mentioned above).

A third step, i.e., the encryption of the platform certificate: the platform certificate plaintext is composed of a device number, a device type and an authentication type. For the encryption of the platform certificate, a key A and a symmetric encryption way (such as an AES encryption algorithm) are adopted to generate a platform certificate ciphertext.

II. The Device Authentication

The device authentication is a reliable access of the device to the cloud platform. The whole authentication process includes a plurality of steps, which are described in the security enhancement module side, the device side and the cloud, respectively.

1. Security Enhancement Module Side:

The generated platform certificate ciphertext is stored in the security enhancement module in advance, and correspondingly, the security enhancement module side specifically performs following steps:

A first step, i.e., an authentication instruction initiated by the device side is received.

The platform certificate ciphertext is decrypted in the security enhancement module by adopting the key A and the symmetric decryption way, to generate the platform certificate plaintext. The key A is consistent with a key used for encrypting the platform certificate plaintext by the cloud platform.

A second step, i.e., a certificate reorganization: a system time is acquired from the inside of the security enhancement module, and the module certificate plaintext is generated by adding a timestamp to the generated platform certificate plaintext.

A third step, i.e., a generation of a module certificate ciphertext: the module certificate plaintext generated in the second step is encrypted by adopting a public key B and an asymmetric encryption way. The public key B is obtained through the following process: the security enhancement module transmits a communication request, and then a protocol conversion is performed through the device side, to convert the USB protocol into the MQTT protocol. The cloud receives the communication request, and a private key b and a public key B are generated, the private key b is stored in the cloud, and the public key B is transmitted to the device side through the MQTT protocol, and the device side converts the public key B into the USB protocol and transmits the USB protocol to the security module.

2. The Device Side:

The device side is used for realizing the transmission of the module certificate ciphertext: the module certificate ciphertext generated by the security enhancement module is transmitted to the device side through the USB protocol, and the device side transmits the module certificate ciphertext to the cloud through the MQTT protocol.

3. Cloud:

The authentication process for the cloud specifically includes following steps:

A first step, i.e., a decryption for the module certificate ciphertext: the cloud decrypts the module certificate ciphertext in the private key b and the asymmetric decryption way.

A second step, i.e., an extraction for the platform certificate: the cloud effectively extracts information of the decrypted module certificate plaintext. In the present disclosure, the cloud extracts an ID identifier inside the security enhancement module. That is, a unique ID inside the security enhancement module is used as a unique reliable root of the device on the cloud.

A third step, i.e., a comparison for the platform: the unique ID inside the security module extracted by the platform is compared with the reliable root stored in the cloud. If the comparison result is successful, the authentication is successful; otherwise, the authentication fails.

A fourth step, i.e., the authentication result in the plaintext form is transmitted to the device side through the MQTT protocol, and the device side transmits the authentication result to the security module through the USB protocol.

III. The Key Negotiation

The key negotiation process specifically includes following steps:

A first step, i.e., the cloud platform asymmetrically encrypts a key C through the platform private key, to generate a ciphertext of the key C.

A second step, i.e., the ciphertext of the key C is transmitted to the data transmission device through the MQTT protocol for the protocol conversion, to convert the MQTT protocol into the USB protocol. The data transmission device transmits the ciphertext of the key C to the security enhancement module through the USB protocol.

A third step, i.e., the security enhancement module decrypts the ciphertext of the key C in the asymmetric decryption way through the platform public key, to obtain a plaintext of the key C. The plaintext of the key C is the security key determined through the key negotiation.

IV. The Data Interactive Transmission

A data uploading process in the data interactive transmission process is introduced, and specifically includes following steps:

A first step, i.e., the data transmission device transmits the uploaded data plaintext to the security enhancement module through the USB protocol.

A second step, i.e., the security enhancement module encrypts the uploaded data plaintext by adopting the key C and the symmetric encryption way, to generate an uploaded data ciphertext.

A third step, i.e., the security enhancement module transmits the uploaded data ciphertext to the data transmission device through the USB protocol, and the data transmission device converts the USB protocol into the MQTT protocol through the protocol conversion, and transmits the uploaded data ciphertext to the cloud platform.

A fourth step, i.e., the cloud platform decrypts the uploaded data ciphertext through the key C and in the symmetric decryption way, to obtain the uploaded data plaintext.

Next, a data issuing process in the data interactive transmission process is introduced, and specifically includes following steps:

A first step, i.e., the cloud platform encrypts an issued data plaintext through the key C and in the symmetric encryption way, to generate an issued data ciphertext, and transmits the issued data ciphertext to the data transmission device in the MQTT protocol way.

A second step, i.e., the data transmission device converts the MQTT protocol into the USB protocol through the protocol conversion, and transmits the issued data ciphertext to the security enhancement module.

A third step, i.e., the security enhancement module decrypts the issued data ciphertext by adopting the key C and the symmetric decryption way, to obtain the issued data plaintext.

A fourth step, i.e., the security enhancement module transmits the issued data plaintext to the data transmission device through the USB protocol.

Therefore, in the embodiment, from a security perspective, different security enhancement modules can be customized according to a specific scene, and a system-level security enhancement is realized by linking with edge devices and terminal devices through the customizing of the security enhancement modules. In the embodiment, the security enhancement module is added to the device side, and the device authentication and the security data interaction way of the security enhancement module, the device side and the platform side are established, so that the security of the device side is protected to the maximum extent. The security enhancement module performs the data interaction with the device side through the USB interface so as to be compatible with the existing devices. In addition, a security data interactive mechanism among the security module, the device side and the cloud platform is constructed through the security module and a security SDK on the device side.

The security enhancement module has at least following characteristics:

Sensitive data, such as the key or the certificate or the like, is reliably stored, and cannot be transmitted to the outside through the USB interface. Moreover, the sensitive data is stored inside the security enhancement module in the encryption way. Even if the security enhancement module is cracked, plaintext information of the encrypted data stored inside the security enhancement module cannot be directly obtained. For example, the security key stored inside the security enhancement module is stored in the ciphertext form through a secondary encryption process.

In addition, the sensitive data stored inside the security enhancement module is not transmitted to the outside. The sensitive data, such as the certificate or the like, may be written in through customized upper computer software and may be written in and not be read out. Moreover, the encryption process and the decryption process are all completed inside the security enhancement module, so that the defect of vulnerability caused by the encryption and decryption in external devices is overcome.

The security enhancement module may dynamically perform the key negotiation operation with the cloud platform through the data transmission device, and a frequency of the key negotiation may be flexibly adjusted according to the device type and the authentication way. In addition, the security key obtained through the key negotiation may be generated in different ways by combining the device type and the authentication way, so that the way of generating the security key can be conveniently determined according to a data security level, thereby further improving the security.

The keys in the authentication process and in the data transmission process may be flexibly set according to the data type. For example, the cloud platform dynamically determines a key matching the data type according to the data type to be transmitted. That is, the type of the key and the encryption and decryption way may be flexibly set according to the data type and the interaction process. For example, different encryption/decryption ways may be selected for different interaction processes. For example, a symmetric key is used for the platform certificate; and an asymmetric key is used for the module certificate, so as to set the key and the encryption and decryption way according to the interaction process and the data security level.

In addition, in an application scenario of the present disclosure, the security module is provided by the cloud platform of the internet of things, and thus belongs to a reliable device, whereas the data transmission device is an external device independent of the cloud platform, and thus belongs to an unreliable device. In order to avoid security problems caused by the attack for the unreliable device, the encryption process and the decryption process for the sensitive data are all implemented by the security enhancement module.

Moreover, in order to further improve the security, a software development kit (SDK) is provided for the security enhancement module. Correspondingly, the data transmission device may communicate with the security enhancement module and the cloud platform only by integrating the SDK. That is, a data transmission is carried out between the security enhancement module and the data transmission device through a preset application interface. The application interface is provided by a software development kit corresponding to the security enhancement module. Therefore, in the embodiment, when data is transmitted between the data transmission device and the security enhancement module, it is required to call a function of the application interface API provided by the SDK to achieve the data transmission. For example, when the data transmission device transmits data to the security enhancement module, it is required to call a transmitting application interface matching with the type of the transmitted data; when the data transmission device receives the data returned by the security enhancement module, it is required to call a receiving application interface matching the type of the received data. Because parameters and execution logic of application interface functions contained in the SDK are predefined, the execution logic related to the access of the sensitive data can be prevented from being written into the interface function in the process of setting the SDK, and the problem that the sensitive data is maliciously accessed is avoided.

Figure 5:
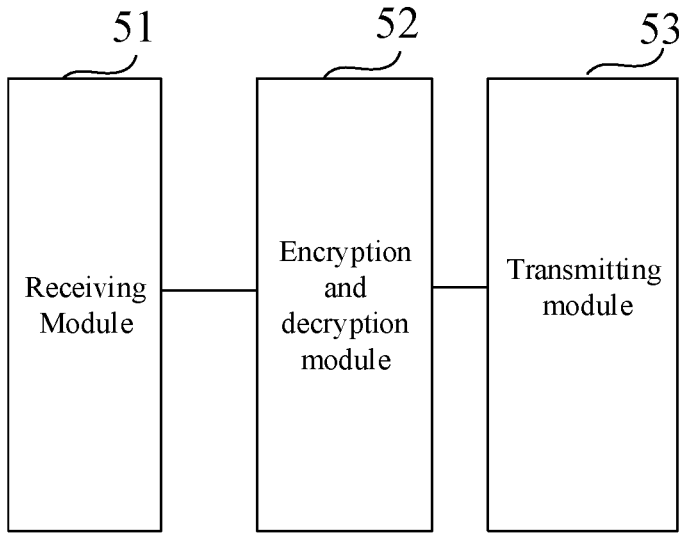
FIG. 5 is a block diagram of a data transmission apparatus according to an embodiment of the present disclosure.

The embodiment of the present disclosure further provides a data transmission apparatus, which may be the above security enhancement module. As shown in FIG. 5, the data transmission apparatus according to an embodiment of the present disclosure includes: a receiving module 51 configured to receive original transmission data transmitted by a data transmission device; an encryption and decryption module 52 configured to determine a security key corresponding to the original transmission data, and perform an encryption and decryption processing on the original transmission data through the security key, to obtain security transmission data; a transmitting module 53 configured to transmit the security transmission data to the data transmission device; the original transmission data is transmitted between the data transmission device and a cloud platform, and the security key is obtained from the cloud platform.

In an optional implementation, the apparatus further includes: a module certificate generation module configured to receive and store a platform certificate generated by the cloud platform in response to a device registration request; add an auxiliary verification data for the platform certificate in response to an authentication instruction transmitted by the data transmission device, to obtain the module certificate; transmit the module certificate to the data transmission device, so that the data transmission device provides the module certificate to the cloud platform for a device authentication; and the receiving module 51 is configured to: receives the original transmission data transmitted by the data transmission device in a case where the device authentication is passed.

In an optional implementation, the device registration request is transmitted by the data transmission device, and includes: module information of the security enhancement module and device information of the data transmission device; and the platform certificate includes: the module information of the security enhancement module and the device information of the data transmission device.

In an optional implementation, the auxiliary verification data includes: timestamp data; and the device information of the data transmission device includes: a device service type and/or a device authentication type.

The encryption and decryption module is configured to: receive the security key returned by the cloud platform in response to the key negotiation request transmitted by the data transmission device; the security key is generated according to the device service type and/or the device authentication type.

In an optional implementation, the encryption and decryption module is specifically configured to: receive a first key obtained after the cloud platform encrypts the security key through a platform private key; and decrypt the first key through a pre-acquired platform public key, to obtain the security key.

In an optional implementation, when the device authentication type is a first authentication type, the security key corresponds to a device identifier; when the device authentication type is a second authentication type, the security key corresponds to a device model; and when the device authentication type is a third authentication type, the security key corresponds to a device service type.

In an optional implementation, the platform certificate generated by the cloud platform is a platform certificate in a ciphertext form; the module certificate generation module is specifically configured to: decrypt the platform certificate in the ciphertext form according to a platform certificate key provided by the cloud platform, to obtain the platform certificate in a plaintext form; add the auxiliary verification data for the platform certificate in the plaintext form, to obtain a module certificate in the plaintext form; encrypt the module certificate in the plaintext form through a module certificate key, to obtain the module certificate in the ciphertext form.

In an optional implementation, the platform certificate in the ciphertext form is obtained in a symmetric encryption way; the module certificate in the ciphertext form is obtained in an asymmetric encryption way; and the module certificate key is obtained from the cloud platform.

In an optional implementation, the encryption and decryption module is specifically configured to: determine a data type of the original transmission data, and determine a security key and an encryption and decryption way according to the data type; perform an encryption and decryption processing on the original transmission data through the security key and the encryption and decryption way.

In an optional implementation, the data type includes at least one of: a plaintext type, a ciphertext type, a transmitting type, a receiving type, a transmission data type and a security verification type.

The security key includes at least one of: a symmetric key, a non-key key, a key acquired from the cloud platform, a locally generated key, an encryption key, a decryption key, a fixed key and a variable key.

The encryption and decryption way includes: a symmetric encryption way, a symmetric decryption way, an asymmetric encryption way and an asymmetric decryption way.

Figure 6:
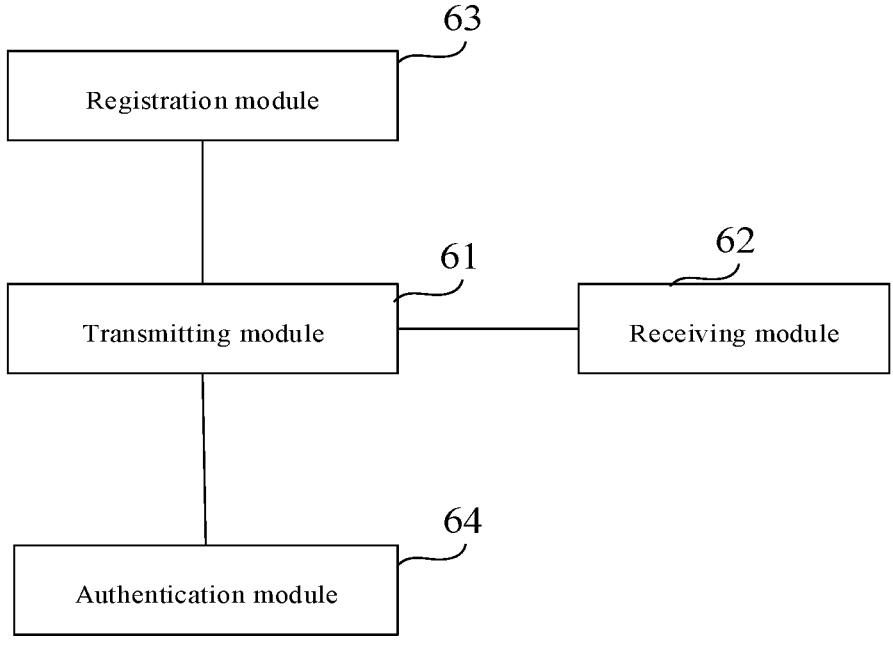
FIG. 6 is a block diagram of a data transmission apparatus according to another embodiment of the present disclosure.

The embodiment of the present disclosure further provides a data transmission apparatus, which may be the above data transmission device. As shown in FIG. 6, the data transmission apparatus according to an embodiment of the present disclosure includes: a transmitting module 61 configured to transmit the original transmission data to the security enhancement module; a receiving module 62 configured to receive the security transmission data on which the security enhancement module performs the encryption and decryption processing according to a security key corresponding to the original transmission data.

The original transmission data is between the data transmission device and the cloud platform, and the security key is obtained from the cloud platform.

In an optional implementation, the apparatus further includes: a registration module 63 configured to transmit a device registration request to the cloud platform, so that the security enhancement module receives and stores a platform certificate generated by the cloud platform in response to the device registration request; an authentication module 64 configured to transmit an authentication instruction to the security enhancement module, so that the security enhancement module adds auxiliary verification data for the platform certificate, to obtain a module certificate.

The receiving module 62 is further configured to: transmit the received module certificate from the security enhancement module to the cloud platform for a device authentication by the cloud platform.

The transmitting module 61 is specifically configured to: transmit the original transmission data to the security enhancement module in a case where the device authentication is passed.

In an optional implementation, the device registration request includes: module information of the security enhancement module and device information of the data transmission device; and the platform certificate includes: the module information of the security enhancement module and the device information of the data transmission device.

The auxiliary verification data includes: timestamp data; the device information of the data transmission device includes: a device service type and/or a device authentication type; the security key corresponding to the original transmission data is generated by the cloud platform according to the device service type and/or the device authentication type.

When the device authentication type is a first authentication type, the security key corresponds to a device identifier;

when the device authentication type is a second authentication type, the security key corresponds to a device model; and when the device authentication type is a third authentication type, the security key corresponds to a device service type.

In an optional implementation, the apparatus further includes: a key negotiation module configured to transmit a key negotiation request to the cloud platform; provide the security key from the cloud platform to the security enhancement module according to a result returned by the cloud platform; and the security key is generated according to the device service type and/or the device authentication type.

In an optional implementation, the key negotiation module is specifically configured to: transmit a first key obtained after the cloud platform encrypts the security key through a platform private key to the security enhancement module, so that the security enhancement module decrypts the first key through a platform public key obtained in advance, to obtain the security key.

In an optional implementation, if the original transmission data is data received by the data transmission device from the cloud platform, the transmitting module is specifically configured to: perform a protocol conversion processing on the original transmission data received through a platform transmission protocol, and transmit the original transmission data on which the protocol conversion processing is performed to the security enhancement module.

If the original transmission data is local data of the data transmission device, the receiving module is further configured to: perform a protocol conversion processing on the security transmission data received through a preset transmission protocol, and transmit the original transmission data on which the protocol conversion processing is performed to the cloud platform.

The embodiment of the present disclosure also provides a cloud platform. As shown in FIG. 7, the cloud platform provided by an embodiment of the present disclosure includes: a key transmitting module 71 configured to transmit a generated security key to a security enhancement module; a first transmission module 72 configured to transmit an encrypted first transmission data to a data transmission device, so that the data transmission device provides the first transmission data to the security enhancement module, so that the security enhancement module performs a decryption processing according to the security key; and/or a second transmission module 73 configured to receive second transmission data which is transmitted by the data transmission device and encrypted by the security enhancement module through the security key.

In an optional implementation, the cloud platform further includes: a platform certificate generation module configured to generate a platform certificate according to a received device registration request, and provide the platform certificate to the security enhancement module.

The second transmission module is further configured to: receive a module certificate transmitted by the security enhancement module through the data transmission device; and parse the module certificate, and perform a device authentication according to a result of the parsing.

In an optional implementation, the platform certificate generation module is specifically configured to: acquire module information of the security enhancement module and device information of the data transmission device in the device registration request, and generate the platform certificate according to the module information of the security enhancement module and the device information of the data transmission device.

In an optional implementation, the platform certificate generation module is specifically configured to: encrypt the module information of the security enhancement module and the device information of the data transmission device to obtain the platform certificate in a ciphertext form.

The second transmission module is specifically configured to: decrypt the received module certificate in the ciphertext form, to obtain the module certificate in a plaintext form; match the module certificate in the plaintext form with a platform certificate generated in advance; and if the matching is successful, the device authentication is passed.

In an optional implementation, the key transmitting module is specifically configured to: acquire device information corresponding to a key negotiation request in response to the key negotiation request transmitted by the data transmission device; generate a security key according to the device information, and transmit the generated security key to the security enhancement module; and the device information includes: a device service type and/or a device authentication type.

In an optional implementation, the key transmitting module is specifically configured to: encrypt the security key through a platform private key, to obtain a first key; and transmit the first key to the security enhancement module through the data transmission device, so that the security enhancement module decrypts the first key through a platform public key acquired in advance, to obtain the security key.

The embodiment of the present disclosure also provides a data transmission system. As shown in FIG. 8, the data transmission system according to an embodiment of the present disclosure includes: A first data transmission apparatus 81, a second data transmission apparatus 82, and a cloud platform 83. The first data transmission apparatus 81 may be the security enhancement module shown in FIG. 5, the second data transmission apparatus 82 may be the data transmission device shown in FIG. 6, and a structure of the cloud platform 83 may be shown in FIG. 7.

Referring to FIG. 9, an embodiment of the present disclosure provides an electronic device, including: one or more processors 901; a memory 902 having one or more programs stored thereon that, when executed by the one or more processors, cause the one or more processors to implement the data transmission method of any one of the above embodiments; one or more I/O interfaces 903 connected between the one or more processors and the memory and configured to enable information interaction between the one or more processors and the memory.

Each processor 901 is a device with a data processing capability, and includes, but is not limited to, a central processing unit (CPU), or the like; the memory 902 is a device with a data storage capability and includes, but is not limited to, a random access memory (RAM, more specifically, SDRAM, DDR, or the like), a read only memory (ROM), an electrically erasable programmable read only memory (EEPROM), a flash; the one or more I/O interfaces (read/write interfaces) 903 are connected between the one or more processors 901 and the memory 902, and may implement the information interaction between the one or more processors 901 and the memory 902, and may include, but not limited to, a data bus or the like.

In some embodiments, the one or more processors 901, the memory 902, and the one or more I/O interfaces 903 are connected to each other through the bus and further connected to other components of a computing device.

The present embodiment further provides a computer readable medium having stored thereon a computer program which, when executed by a processor, implements the data transmission method of any one of the above embodiments. Specific steps of the data transmission method are not described herein again, to avoid repeated descriptions.

It will be understood by one of ordinary skill in the art that all or some of the steps in the above disclosed method, functional modules/units in the system and the apparatus may be implemented as software, firmware, hardware, or suitable combinations thereof. In a hardware implementation, a division between functional modules/units referred to in the above description does not necessarily correspond to a division of physical components. For example, one physical component may have multiple functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit. Such software may be distributed on computer readable media, which may include computer storage media (or non-transitory media) and communication media (or transitory media). The term computer storage media includes volatile and nonvolatile, removable and non-removable media implemented in any method or technology for storage of information such as computer readable instructions, data structures, program modules or other data, as is well known to one of ordinary skill in the art. The computer storage media include, but are not limited to, RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices, or any other medium which may be used to store the desired information and which may be accessed by a computer. In addition, the communication media typically include computer readable instructions, data structures, program modules or other data in a modulated data signal such as a carrier wave or other transport mechanism, and may include any information delivery media, as is well known to one of ordinary skill in the art.

It should be noted that the terms "including", "comprising," or any other variation thereof herein are intended to cover a non-exclusive inclusion, such that a process, method, article, or apparatus that includes a list of elements does not include only those elements but may include other elements not expressly listed or inherent to such process, method, article, or apparatus. Without further limitation, an element recited by a phrase "including an . . . " does not exclude the presence of other identical elements in the process, method, article, or apparatus that includes the element.

It should be understood that the above embodiments are merely exemplary embodiments adopted to explain the principles of the present disclosure or the utility model, and the present disclosure or the utility model is not limited thereto. It will be apparent to one of ordinary skill in the art that various changes and modifications may be made therein without departing from the spirit and scope of the present disclosure or the utility model, and such changes and modifications also fall within the scope of the present disclosure or the utility model.

What is claimed is:

1. A data transmission method for a security enhancement module, comprising:

receiving original transmission data transmitted by a data transmission device;

determining a security key corresponding to the original transmission data, and performing an encryption and decryption processing on the original transmission data through the security key, to obtain security transmission data; and transmitting the security transmission data to the data transmission device;

wherein the original transmission data is transmitted between the data transmission device and a cloud platform, and the security key is obtained from the cloud platform;

wherein prior to the receiving the original transmission data transmitted by the data transmission device, the method further comprises:

receiving and storing a platform certificate generated by the cloud platform in response to a device registration request; and adding an auxiliary verification data for the platform certificate in response to an authentication instruction transmitted by the data transmission device, to obtain a module certificate; and transmitting the module certificate to the data transmission device, so that the data transmission device provides the module certificate to the cloud platform for a device authentication;

wherein the receiving the original transmission data transmitted by the data transmission device comprises: receiving the original transmission data transmitted by the data transmission device in a case where the device authentication is passed; and wherein the platform certificate generated by the cloud platform is a platform certificate in a ciphertext form; and wherein the adding an auxiliary verification data for the platform certificate to obtain a module certificate comprises:

decrypting the platform certificate in the ciphertext form according to a platform certificate key provided by the cloud platform, to obtain the platform certificate in a plaintext form;

adding the auxiliary verification data for the platform certificate in the plaintext form, to obtain a module certificate in the plaintext form; and encrypting the module certificate in the plaintext form through a module certificate key, to obtain the module certificate in the ciphertext form.

2. The method of claim 1, wherein the device registration request is transmitted by the data transmission device; and wherein the device registration request comprises: module information of the security enhancement module and device information of the data transmission device; and the platform certificate comprises: the module information of the security enhancement module and the device information of the data transmission device.

3. The method of claim 2, wherein the auxiliary verification data comprises: timestamp data; and the device information of the data transmission device comprises: a device service type and/or a device authentication type;

the determining a security key corresponding to a data type of the original transmission data comprises:

receiving the security key returned by the cloud platform in response to a key negotiation request transmitted by the data transmission device; and wherein the security key is generated according to the device service type and/or the device authentication type.

4. The method of claim 3, wherein the receiving the security key returned by the cloud platform in response to a key negotiation request transmitted by the data transmission device comprises:

receiving a first key obtained after the cloud platform encrypts the security key through a platform private key; and decrypting the first key through a pre-acquired platform public key, to obtain the security key.

5. The method of claim 4, wherein when the device authentication type is a first authentication type, the security key corresponds to a device identifier;

when the device authentication type is a second authentication type, the security key corresponds to a device model; and when the device authentication type is a third authentication type, the security key corresponds to a device service type.

6. The method of claim 1, wherein the platform certificate in the ciphertext form is obtained in a symmetric encryption way;

the module certificate in the ciphertext form is obtained in an asymmetric encryption way; and the module certificate key is obtained from the cloud platform.

7. A data transmission method for a data transmission device, comprising:

transmitting original transmission data to a security enhancement module; and receiving security transmission data on which the security enhancement module performs an encryption and decryption processing according to a security key corresponding to the original transmission data;

wherein the original transmission data is transmitted between the data transmission device and a cloud platform, and the security key is obtained from the cloud platform;

wherein prior to the transmitting the original transmission data to the security enhancement module, the method further comprises:

transmitting a device registration request to the cloud platform, so that the security enhancement module receives and stores a platform certificate generated by the cloud platform in response to the device registration request;

transmitting an authentication instruction to the security enhancement module, so that the security enhancement module adds auxiliary verification data for the platform certificate, to obtain a module certificate; and transmitting the received module certificate from the security enhancement module to the cloud platform for a device authentication by the cloud platform;

wherein the transmitting the original transmission data to the security enhancement module comprises:

transmitting the original transmission data to the security enhancement module in a case where the device authentication is passed; and wherein the device registration request comprises: module information of the security enhancement module and device information of the data transmission device;

the platform certificate comprises: the module information of the security enhancement module and the device information of the data transmission device;

the auxiliary verification data comprises: timestamp data;

the device information of the data transmission device comprises: a device service type and/or a device authentication type;

the security key corresponding to the original transmission data is generated by the cloud platform according to the device service type and/or the device authentication type;

wherein when the device authentication type is a first authentication type, the security key corresponds to a device identifier;

when the device authentication type is a second authentication type, the security key corresponds to a device model; and when the device authentication type is a third authentication type, the security key corresponds to a device service type.

8. The method of claim 7, wherein prior to the receiving security transmission data on which the security enhancement module performs the encryption and decryption processing according to the security key corresponding to the original transmission data, the method further comprises:

transmitting a key negotiation request to the cloud platform; and providing the security key from the cloud platform to the security enhancement module according to a result returned by the cloud platform;

wherein the security key is generated according to the device service type and/or the device authentication type.

9. The method of claim 8, wherein the providing the security key from the cloud platform to the security enhancement module comprises:

transmitting a first key obtained after the cloud platform encrypts the security key through a platform private key to the security enhancement module, so that the security enhancement module decrypts the first key through a pre-acquired platform public key, to obtain the security key.

10. The method of claim 7, wherein if the original transmission data is data received by the data transmission device from the cloud platform, the transmitting the original transmission data to the security enhancement module comprises:

performing a protocol conversion processing on the original transmission data received through a platform transmission protocol, and transmitting the original transmission data on which the protocol conversion processing is performed to the security enhancement module;

wherein if the original transmission data is local data of the data transmission device, after the receiving security transmission data on which the security enhancement module performs an encryption and decryption processing according to a security key corresponding to the original transmission data, the method further comprises:

performing a protocol conversion processing on the security transmission data received through a preset transmission protocol, and transmitting the security transmission data on which the protocol conversion processing is performed to the cloud platform.

11. A data transmission method for a cloud platform, comprising:

transmitting a generated security key to a security enhancement module;

transmitting an encrypted first transmission data to a data transmission device, so that the data transmission device provides the first transmission data to the security enhancement module, and the security enhancement module performs a decryption processing according to the security key; and/or receiving second transmission data which is transmitted by the data transmission device and encrypted by the security enhancement module through the security key, the method further comprises:

generating a platform certificate according to a received device registration request, and providing the platform certificate to the security enhancement module;

receiving a module certificate transmitted by the security enhancement module through the data transmission device; and parsing the module certificate, and performing a device authentication according to a result of the parsing;

wherein the generating the platform certificate according to the received device registration request comprises:

acquiring module information of the security enhancement module and device information of the data transmission device in the device registration request, and generating the platform certificate according to the module information of the security enhancement module and the device information of the data transmission device; and wherein the generating the platform certificate according to the module information of the security enhancement module and the device information of the data transmission device comprises:

encrypting the module information of the security enhancement module and the device information of the data transmission device, to obtain the platform certificate in a ciphertext form;

wherein the parsing the module certificate and performing the device authentication according to the result of the parsing comprises:

decrypting the received module certificate in the ciphertext form, to obtain the module certificate in a plaintext form; and matching the module certificate in the plaintext form with a platform certificate generated in advance; and wherein if the matching is successful, the device authentication is successful.

12. The method of claim 11, wherein the transmitting the generated security key to the security enhancement module comprises:

acquiring device information corresponding to a key negotiation request in response to the key negotiation request transmitted by the data transmission device, and generating the security key according to the device information, and transmitting the generated security key to the security enhancement module;

wherein the device information comprises: a device service type and/or a device authentication type.

13. The method of claim 12, wherein the transmitting the generated security key to the security enhancement module comprises:

encrypting the security key through a platform private key, to obtain a first key; and transmitting the first key to the security enhancement module through the data transmission device, so that the security enhancement module decrypts the first key through a pre-acquired platform public key, to obtain the security key.

* * * * *